(Model.)
2 Sheets—Sheet 1.
W. E. JACOBS.
Road Scraper.
No. 242,455. Patented June 7, 1881.
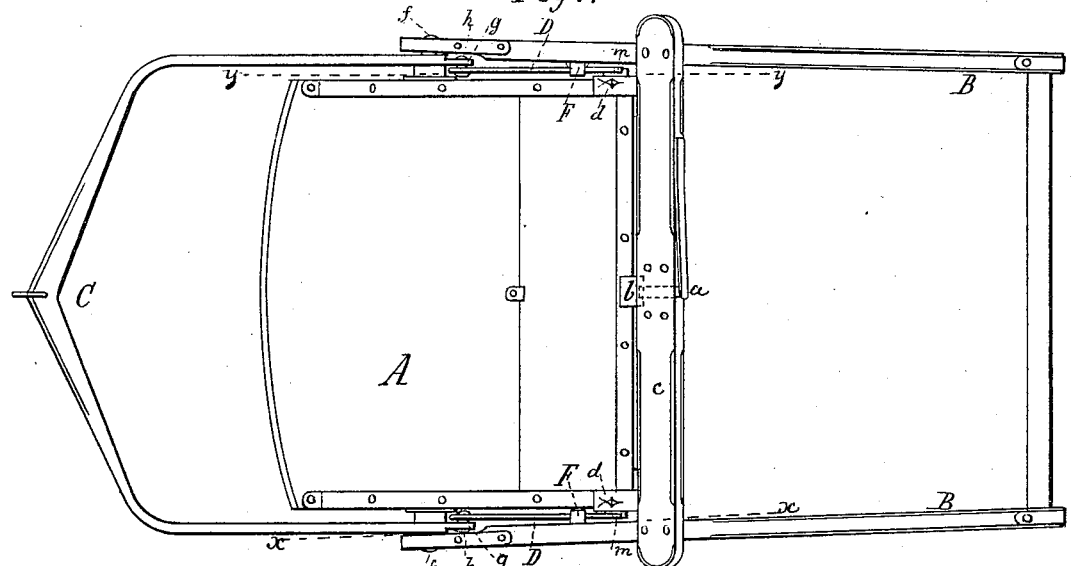
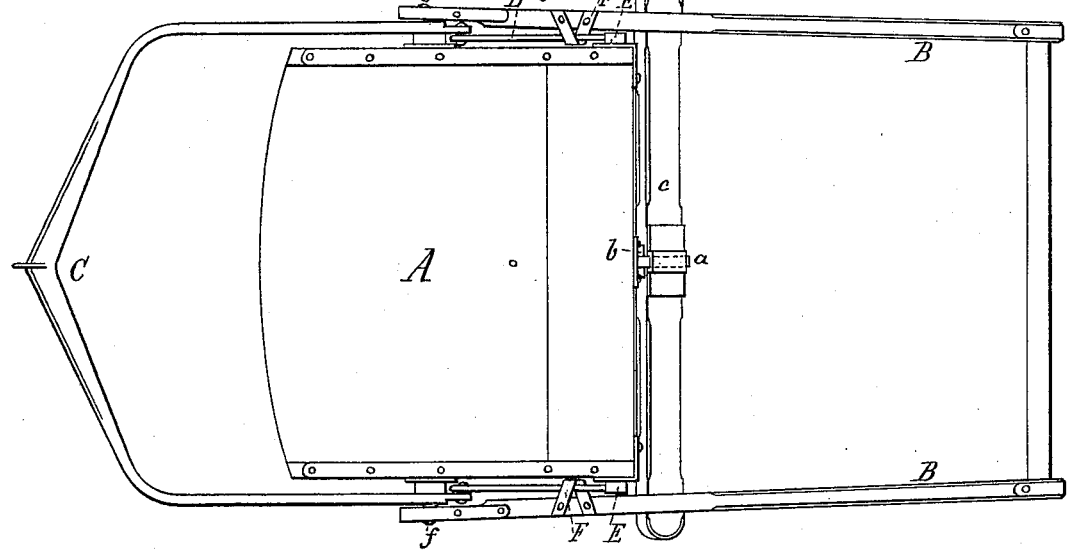
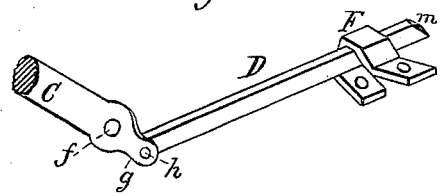
Witnesses:
J. P. Theo. Lang.
H. A. Hall
Inventor:
William E. Jacobs.
by his attys
Mason Fenwick & Lawrence (Model.) 2 Sheets—Sheet 2.
W. E. JACOBS.
Road Scraper.
No. 242,455. Patented June 7, 1881.
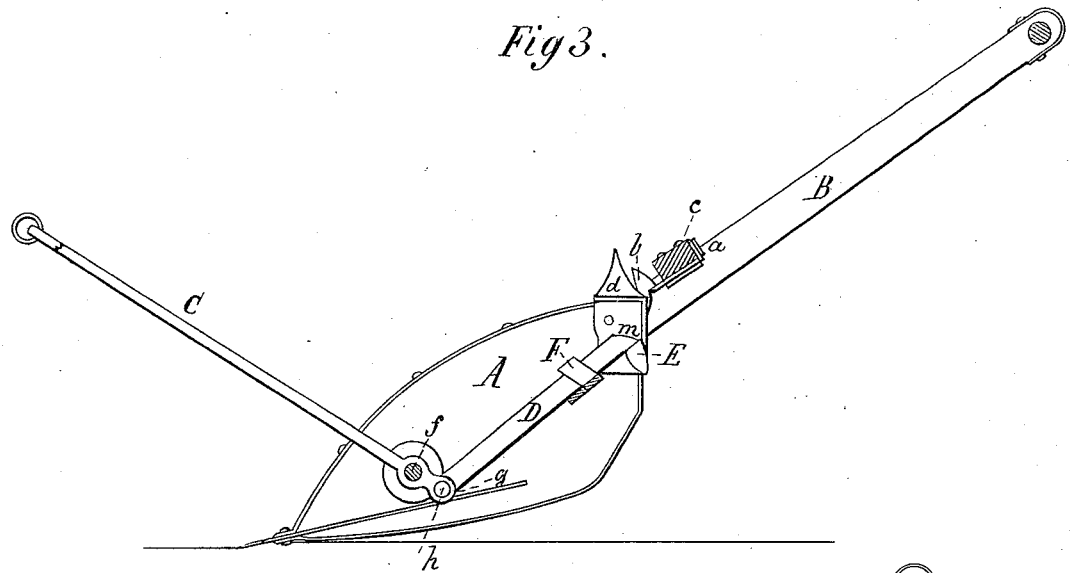
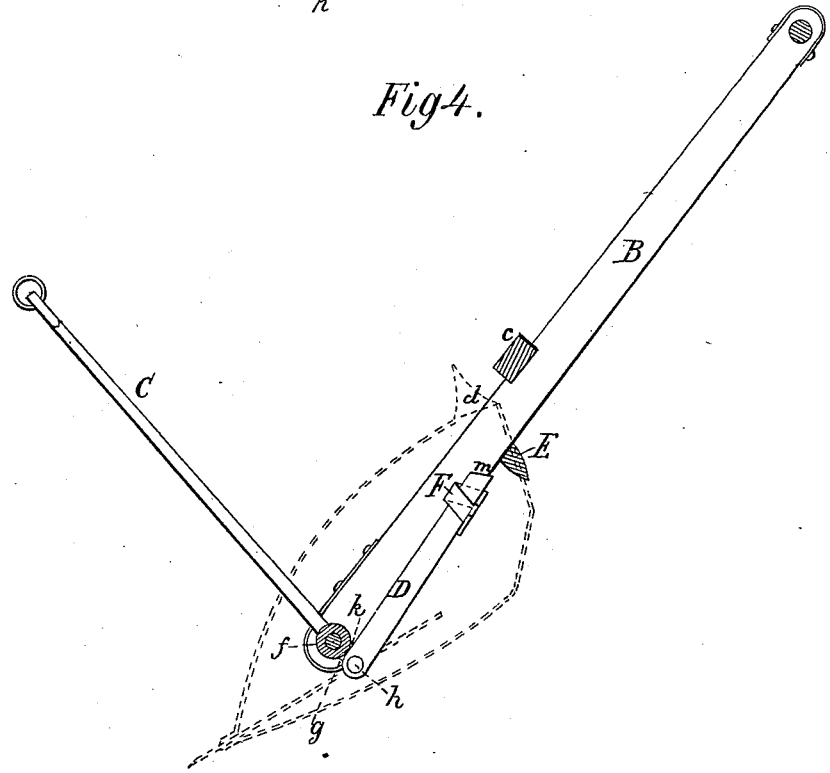
Witnesses:
J. P. Theo. Lang.
H. A. Hall.
Inventor:
William E. Jacobs
by his atty
Mason Fenwick Lawrence

UNITED STATES PATENT OFFICE.

WILLIAM E. JACOBS, OF COLUMBUS, OHIO.

ROAD-SCRAPER.

SPECIFICATION forming part of Letters Patent No. 242,455, dated June 7, 1881.

Application filed December 18, 1880. (Model.)

*To all whom it may concern:*

Be it known that I, WILLIAM E. JACOBS, a citizen of the United States, residing at Columbus, in the county of Franklin and State of Ohio, have invented a new and useful Improvement in Road-Scrapers, of which the following is a specification.

The nature of my invention consists in the combination, with a revolving scraper which is provided with an ordinary spring latching contrivance, of certain peculiarly-operating draw-bars and stops, as will be hereinafter fully described; and it also consists in certain other combinations of parts, as will be hereinafter described and claimed.

In the accompanying drawings, Figure 1 is a top view of a road-scraper having my improvements applied to it. Fig. 2 is an inverted plan of the same. Fig. 3 is a longitudinal section of the scraper in the line $x\,x$ of Fig. 1, the parts being adjusted so as to permit the scraper-bowl to revolve. Fig. 4 is a detail longitudinal section in the line $y\,y$ of Fig. 1, looking toward the right-hand handle. Fig. 5 is a detail view of part of the bail and of one of the guides and one of the draw-bars.

A in the drawings is the bowl, B the handles, and C the bail, of the scraper.

Across the handles, just at the rear upper edge of the bowl, an ordinary cross-bar, $c$, with ordinary spring latching device, $a$, is applied.

Upon the back and near the upper edge of the bowl B a stop, $b$, is provided, and against the under side of this stop the latching device $a$ catches, and thereby, as usual, prevents the rear part of the bowl moving downward while dirt is being collected into the bowl. The stop $b$ is beveled on its rear upper portion, as usual, in order to permit the bowl to pass by the spring latching device $a$ at the moment the bowl has completed its revolution and dumped its load.

At the rear corners of the bowl spurs $d$ for taking hold of the earth and assisting in the revolution of the bowl are provided, as usual.

The handles B and bail C are connected by the same pivots to the bowl, as indicated at $f$, and both the handles and the bail turn about the same axis.

On the bail, at each of its rear ends, an extension, $g$, is formed, and to each extension $g$ a plain strong draw-bar, D, is pivoted, as indicated at $h$. The draw-bars D are beveled off, as indicated at $m$, on their upper rear ends, in order that they may be capable of gliding underneath the stop-lugs E at such times as breakage of the parts is liable. These draw-bars D are passed through guiding-loops F, attached to the handles B, in the manner shown. The loops being broad and strong, they afford a perfect guide and a substantial support for the draw-bars. The position these loops occupy is an intermediate one between the pivots of the bail and the stop-lugs E, as shown, and thus located they hold up the draw-bars, whether in or out of locking position.

The stop-lugs E are attached to the rear corners of the bowl A, and they may be formed on foundation-plates of the spurs $d$, if found desirable. The said lugs, in side elevation, are of V form, and by this form they are enabled to co-operate with the beveled surfaces $m$ of the draw-bars at such times as said bars may incidentally fall below the top of the lugs or when the bowl is incidentally freed from the draw-bars, which at times occurs without the bowl revolving entirely around, and when it does occur serious breakage is experienced with scrapers of ordinary construction, and would be experienced with my draw-bars if the beveled surfaces were not formed on them.

The draw-bars rest flatwise upon the top of the lugs, and thus have a strong and broad support, and when the draw-bars are resting upon the lugs the bowl of the scraper cannot move upward at its rear end, and it being held against downward movement at said end by the latching device $a$ and stop $b$, it cannot move at all until the draw-bars are withdrawn from the lugs.

To withdraw the draw-bars from over the lugs E the bail remains in about a horizontal position, and the handles and bowl are thrown up high enough to bring the draw-bars to a position about at right angles to the bail, and by this means the rear ends of the draw-bars are caused by the eccentric ends $g$ of the bail to move forward, and thereby clear the lugs, and this being accomplished, the bowl is free to revolve, and being drawn by the team, it is caused to revolve and dump its load, whereupon the spurs $d$ take into the ground and assist in readjusting it to its position for reloading.

In the operation of releasing the draw-bars these bars may be made to bind at $k$ upon the hubs of the pivots $f$, and thereby prevent a too great elevation of the handles.

What I claim as my invention, and desire to secure by Letters Patent, is—

1. The combination, with a scraper provided with a latching device, $a$, of side draw-bars or inflexible latches, which are guided forward of their resting-stops, and are applied to stand above and rest upon supporting-stops while the scraper-bowl is being filled, and are attached by pivots to extensions $g$ of the bail of the scraper, and caused to clear said stops while the bowl is being emptied, substantially as described.

2. The draw-bars D, attached by pivots to extensions $g$ of the bail C of a scraper, and provided with beveled surfaces $m$, in combination with resting-stops E and latching device $a$, substantially as and for the purpose described.

3. The draw-bars D, attached by pivots to extensions $g$ of the bail C of a scraper, in combination with resting-stops E and latching device $a$, substantially as and for the purpose described.

4. The guiding-loops F, applied to the handles forward of the lugs E, in combination with the draw-bars D, resting-lugs E, and latching device $a$, substantially as and for the purpose described.

5. The combination of the bowl provided with the lugs E, the handles provided with the loops F forward of the resting lugs or stops, the bail provided with draw-bars attached to its extensions $g$, and latching device $a$, substantially as and for the purpose described.

WILLIAM E. JACOBS.

Witnesses:
J. D. SULLIVAN,
J. C. RICHARDS.